Aug. 25, 1959   C. P. SMITH   2,901,697
ANALYSIS OF VOLTAGE DISTRIBUTION
Filed Feb. 29, 1956   9 Sheets-Sheet 1

INVENTOR.
CALDWELL P. SMITH
BY Wade Koonty
Martin J. Finnegan
ATTORNEYS

INVENTOR.
CALDWELL P. SMITH

Aug. 25, 1959 C. P. SMITH 2,901,697
ANALYSIS OF VOLTAGE DISTRIBUTION
Filed Feb. 29, 1956 9 Sheets-Sheet 4
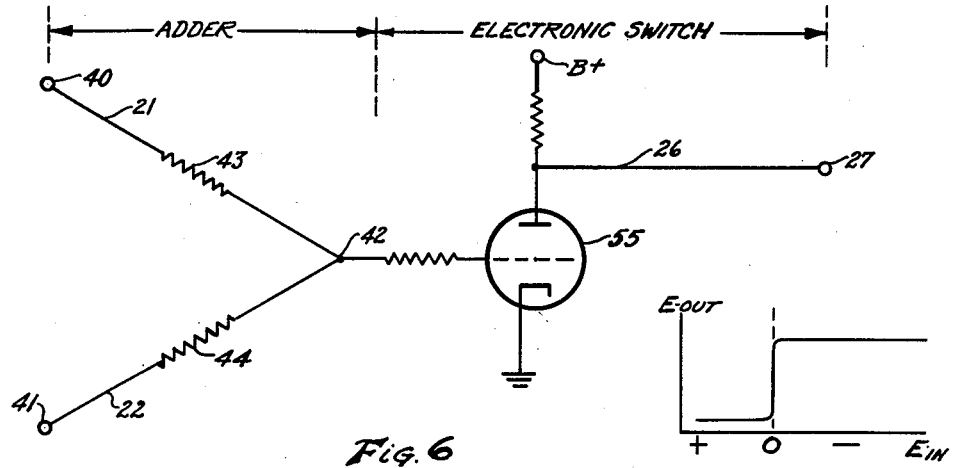
Fig. 6
Fig. 6a
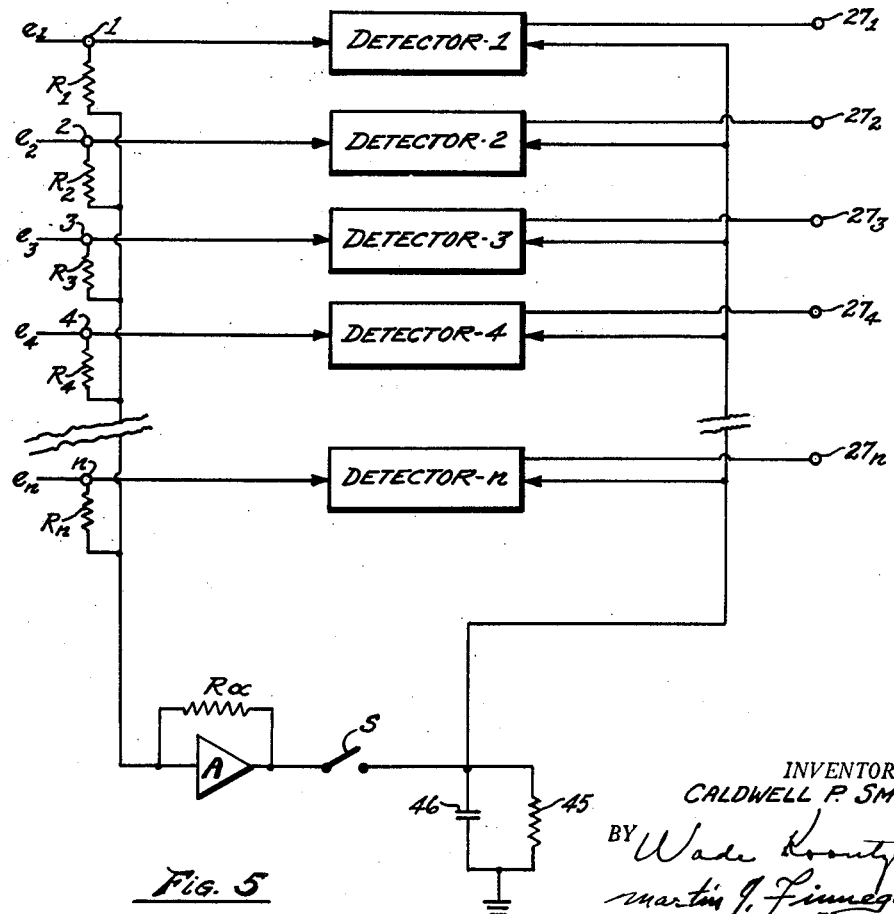
Fig. 5
INVENTOR.
CALDWELL P. SMITH
BY Wade Kountz
Martin J. Finnegan
ATTORNEYS

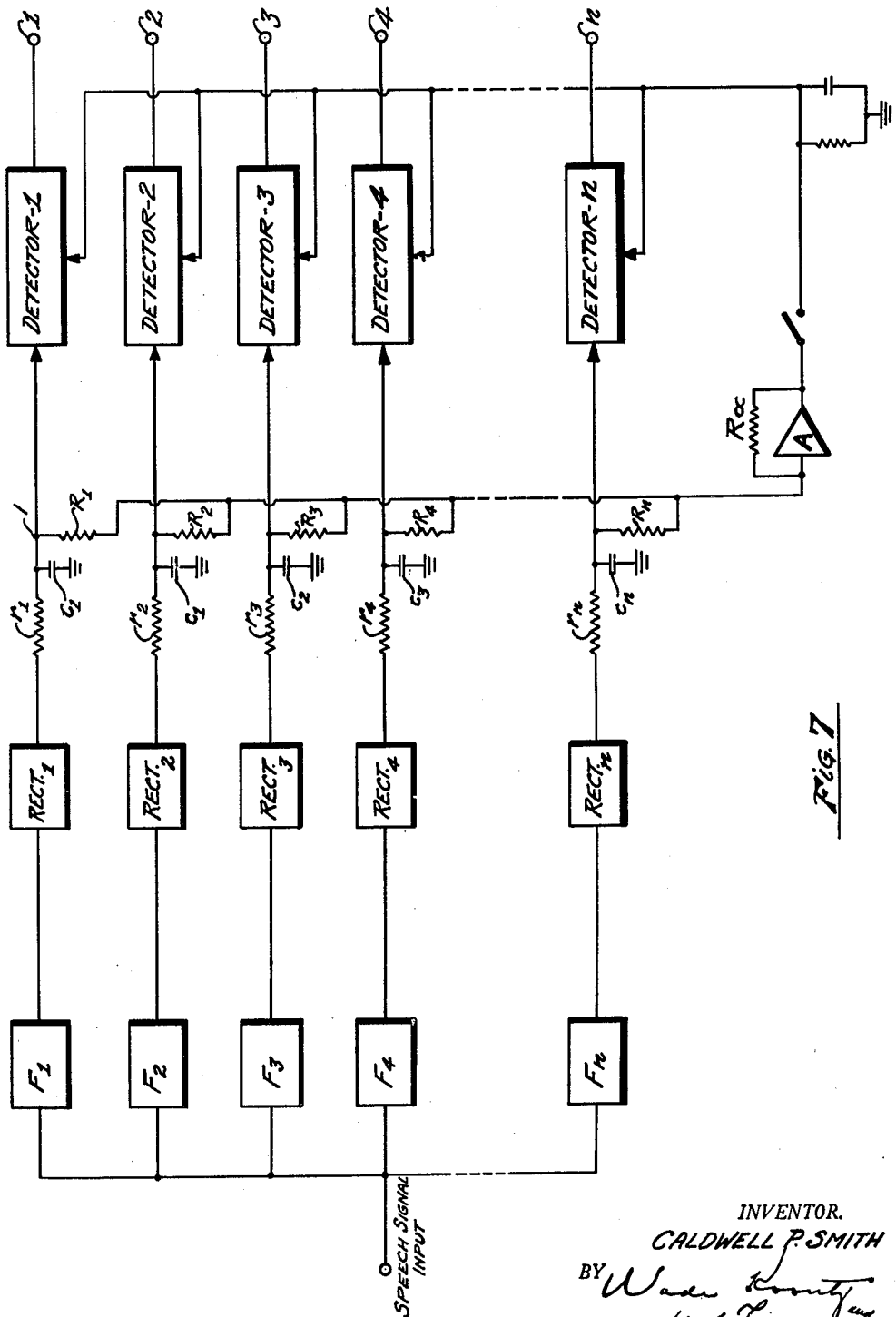

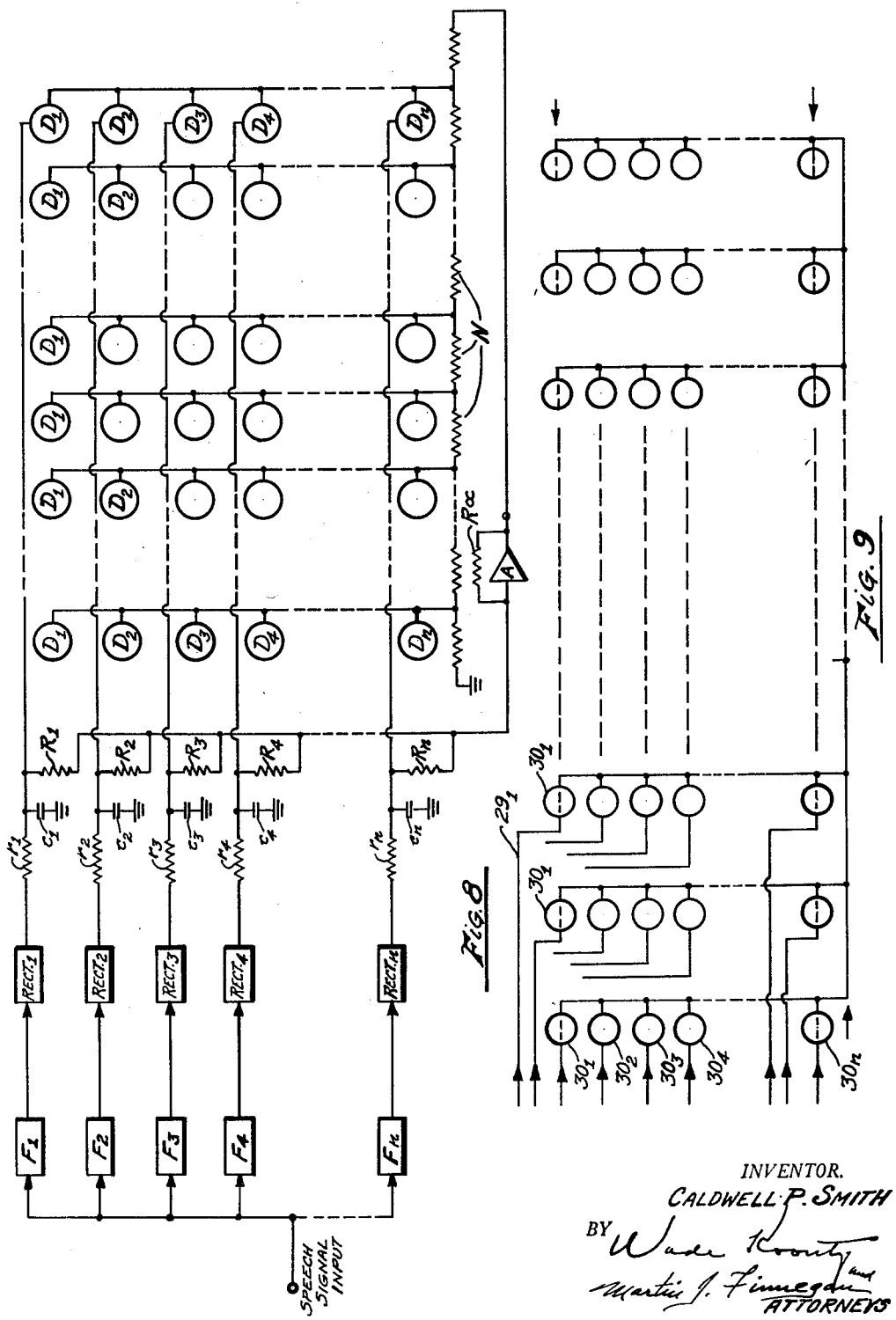

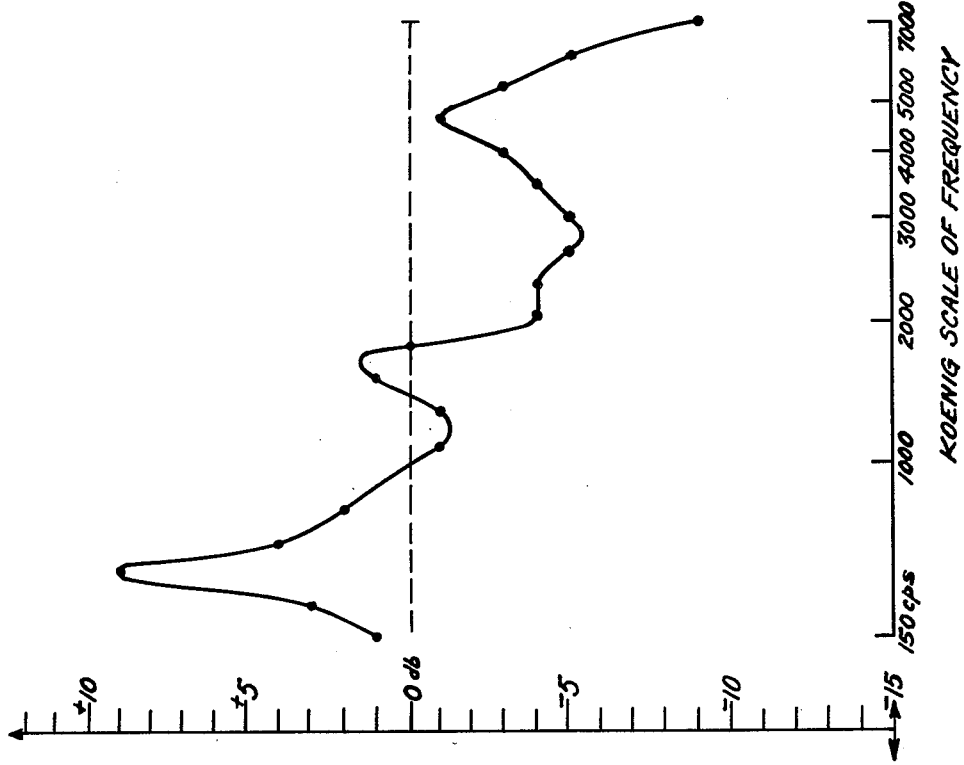
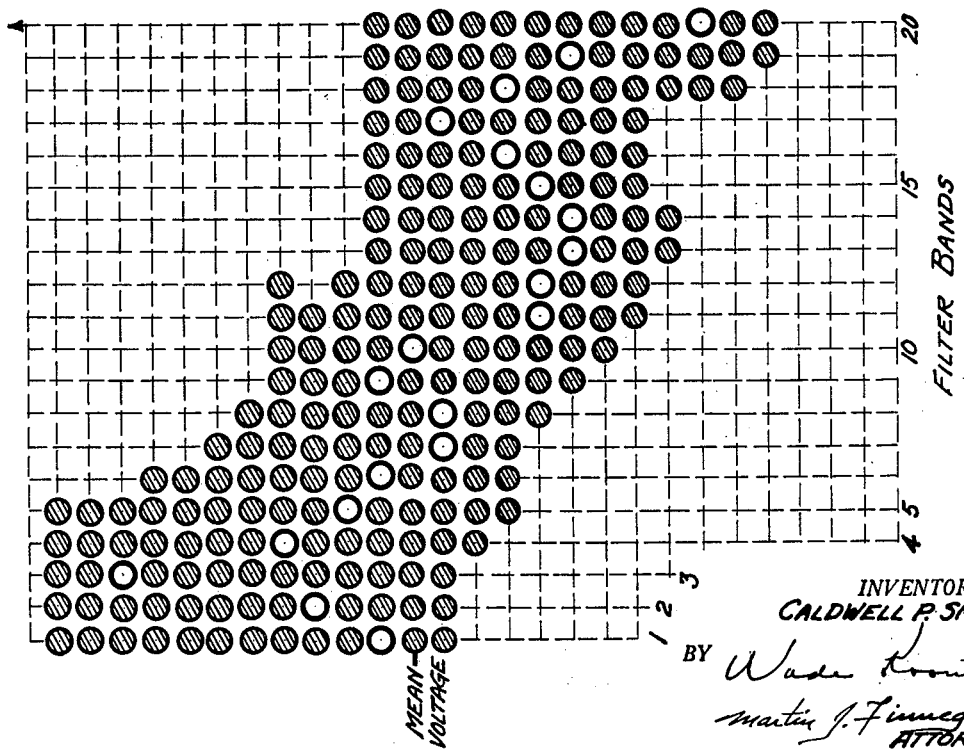

Aug. 25, 1959 C. P. SMITH 2,901,697
ANALYSIS OF VOLTAGE DISTRIBUTION
Filed Feb. 29, 1956 9 Sheets-Sheet 9

INVENTOR.
CALDWELL P. SMITH
BY
ATTORNEYS

United States Patent Office 2,901,697
Patented Aug. 25, 1959

2,901,697

ANALYSIS OF VOLTAGE DISTRIBUTION

Caldwell P. Smith, Bedford, Mass., assignor to the United States of America as represented by the Secretary of the Air Force Application February 29, 1956, Serial No. 568,688

18 Claims. (Cl. 324—77)

(Granted under Title 35, U.S. Code (1952), sec. 266)

The invention described herein may be manufactured and used by or for the United States Government for governmental purposes without payment to me of any royalty thereon.

This invention relates to the analysis of patterns of voltage distribution, and to the utilization of such analysis, either in the form of a visual display of the distribution pattern, or otherwise.

Physical phenomena are often manifested by characteristic patterns of distribution of measurable quantities such as voltage, pressure, temperature, mass etc., which patterns are indicative of the quantities under analysis. For example, complex auditory signals such as speech and music are accurately described by their frequency spectra. An array of frequency-band filters will specify such signals by generating an array of voltages specifying the spectra patterns.

The interpretation of such patterns is vexed by the fact that they are a function not only of the spectrum of the signal entering the analysing filter set at any moment, and the characteristics of the filter set, but of the amplitude of the input signal as well. As speech and music are characterized by amplitude that changes almost continuously over a wide dynamic range, it is very difficult to interpret such voltage patterns.

The present invention provides methods and apparatus for transforming such a voltage pattern by neutralizing the significance of the amplitude-responsive component of the pattern, so that the resultant pattern may be said to be a normalized one—that is, a pattern which (while still indicative of the spectrum of the input signal) is not affected by changes in input signal amplitude. Thus the invention makes it possible to analyse the more significant characteristic of a measurable quantity (as, for example, its frequency spectrum) by a manner of procedure that is capable of discriminating, automatically, between the said significant characteristic of the signal being measured (namely, its frequency spectrum), and the less significant characteristic (namely, its amplitude), so that the indication displayed varies only to the extent that the signal spectrum varies and does not respond in any degree to signal amplitude variations.

The proposed method of operation, as applied to an array of frequency band filters, has two major steps: first, each voltage of the array is measured in terms of its ratio with respect to the mean or average voltage of the array. Secondly, the set of ratios obtained may be expressed on a suitable scale calibrated in linear or non-linear graduations as, for examples, logarithmic, square-law, or square-root. The input voltage array may be derived from a speech or musical sound spectra, from a pressure distribution indicator (strain gages or the like), from a temperature distribution indicator (thermo-couples or the like), or from an index of any other measurable distribution, or continuum, that can be translated into an array of voltages, either directly or through the instrumentality of interposed transducer circuitry. Frequency-selective circuitry may also be interposed, particularly when the frequency range of the input voltage array is beyond the audio range.

These and other characteristics and objects of the invention will be understood upon reference to the following detailed description of the embodiments illustrated in the accompanying drawings, wherein:

Fig. 5 is a diagram schematically illustrating a third embodiment of the invention involving the concept of periodic sampling;

Fig. 6 is a circuit diagram of a signal detection unit suitable for use in the Fig. 5 embodiment of the invention;

Fig. 6a is a graph of the performance curve for the control tube of Fig. 6;

Fig. 7 is a diagram schematically illustrating how the periodic sampling method illustrated in Fig. 5 can be applied to the analysis of speech signals;

Fig. 8 is a diagram illustrating how the matrix comparison arrangement of Fig. 1 can be applied to the analysis of speech signals;

Fig. 9 is a diagram of a matrix of devices for visual indication of the results of the voltage distribution analyis;

Fig. 10 is a view of the matrix of Fig. 9 showing the effect of the voltage comparison operation in producing illumination of certain of the visual display elements;

Fig. 11 is a plotted curve conforming in contour to the visual display pattern indicated by the illuminated elements in Fig. 10.

Figure 1:
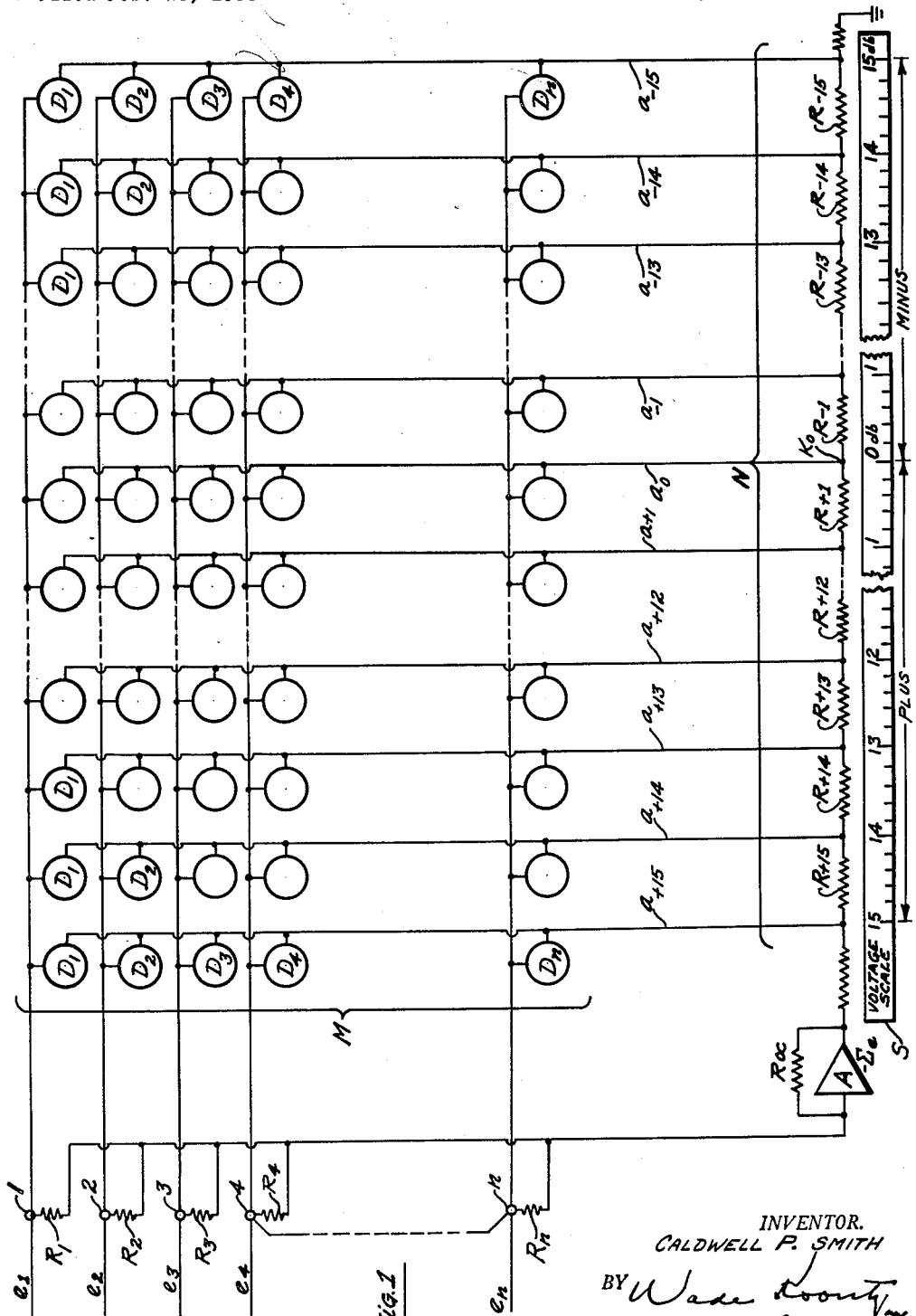
Fig. 1 is a diagram showing a set of voltage divider units, representing reference voltages, positioned for comparison with a matrix of voltage detection units responsive to input signal voltages distributed thereto; this being a first embodiment of the invention.
Figure 3:
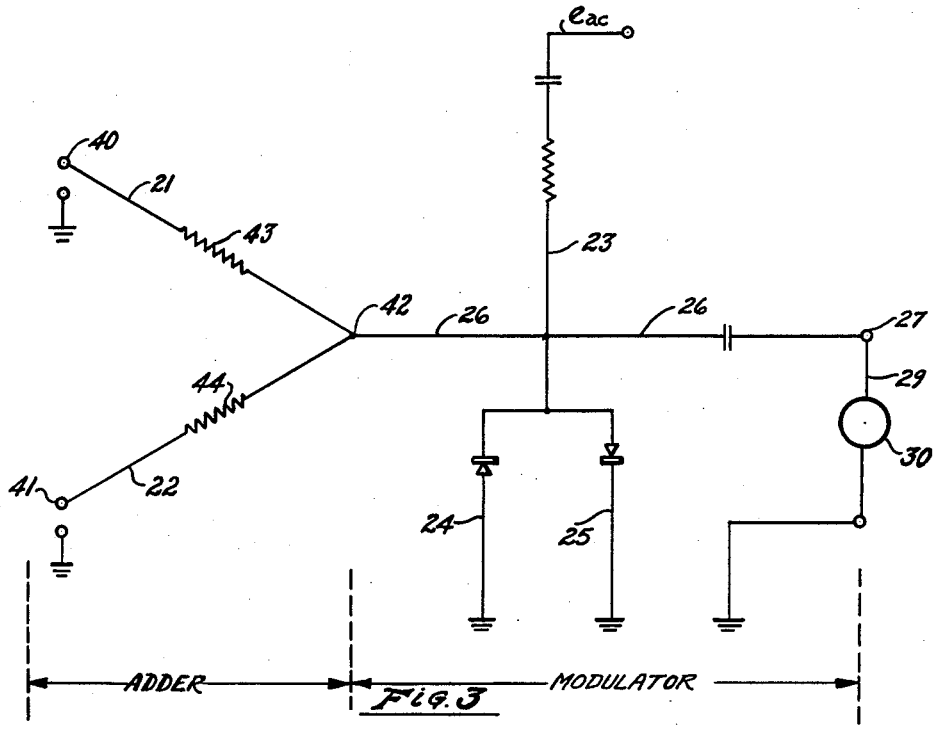
Fig. 3 is a diagram of the components and electrical connections typical of each of the input signal detection units, adapted for use in either the Fig. 1 or the Fig. 2 embodiment of the invention.

Referring first to Fig. 1, the circuitry there shown includes a voltage comparison matrix M constituted by a plurality of columns of detection units, each having the electrical components indicated in Fig. 3, wherein a typical detector wiring diagram is illustrated in detail. As indicated in Fig. 1, the successive detection units $D_1$ to $D_n$ of each column of the matrix are supplied with successive unidirectional voltage values $e_1$ to $e_n$, respectively, corresponding to successive segments of the complete signal content to be analysed. These signal voltages are supplied to the matrix M by way of input terminals 1 to $n$, of which only terminals 1, 2, 3, 4, and the final terminal $n$, are actually shown in Fig. 1. The resistors $R_1$ to $R_n$, associated with matrix input terminals 1 to $n$, respectively, together with D.-C. amplifier A, and feedback resistor $R_{alpha}$, comprise an adding circuit of a type well known in the electronic computing art. At the output terminal of amplifier A is generated a voltage $-\Sigma e$, representing the sum of the voltages of the input array, i.e., $e_1+e_2+e_3+e_4+ \ldots +e_n$. Although the magnitude of this signal is $\Sigma e$, the polarity is reversed in amplifier A. These two functions, addition and reversal of polarity, may be accomplished by the circuit structure shown, or may be performed in separate circuits. For example, any of the types of adding circuits, well known in the electronics art, can be used in place of the feedback amplifier. Further, the reversal of polarity can be an integral part of the adding circuit, or can be accomplished in a separate amplifier having unity gain. Other adding circuits, consisting of triode tubes with a common cathode load resistor, pentode tubes with a common plate load resistor, etc., may be utilized.

The voltage $-\Sigma e$ is applied across a voltage divider network N consisting of resistor segments $R_{+15}$ to $R_{-15}$ corresponding in number to the number of columns in the detection matrix, and serving to divide the voltage $-\Sigma e$ into precise ratios, as established by the positions of the tap-off lines "$a$" leading from the voltage divider to the successive columns $D_1$–$D_n$ of the detection matrix M.

Consider first the central tap $K_0$, located $R_0$ ohms from the bottom of the voltage divider network. The voltage appearing at this tap is $$-\Sigma e \frac{R_0}{R}$$

where R represents the total resistance of the network N. By locating tap $K_0$ such that $$\frac{R_0}{R} = \frac{1}{n}$$

where $n$ = number of voltages in the input array, the voltage at tap $K_0$ will be $$\frac{-\Sigma e}{n}$$

or the sum of the input voltages divided by their number, which is the mean or average of the input voltage array.

The tap $K_0$ establishes the central point about which the other voltage taps are spaced symmetrically on the desired scale of measurement, i.e., on a linear, logarithmic, square-law or other scale. A decibel scale is indicated at S in Fig. 1. In this manner there is established an array of reference voltages, with which the input array is matched or correlated in the matrix M.

Each of the taps on the voltage divider network N is related to the mean or average voltage $-\Sigma e$ by an exact ratio, established by the position of the tap. The comparison matrix M compares each of the input voltages with the set of reference voltages in a simultaneous process. That reference voltage most closely matching the input voltage is automatically determined. The points in the matrix where identities occur establish a new, normalized pattern of distribution of the input array signals.

Matching or comparison of the input voltage array with the reference voltage array is accomplished in the detection circuitry of the individual detection units "D" of the matrix M of Fig. 1. Circuitry typical of each of these units is indicated in Fig. 3. As there shown, the circuitry includes (for each unit "D") first, an adder circuit having two branches 21 and 22, secondly, an input line 23 for reception of the A.-C. carrier wave, thirdly, a modulator circuit having two branches 24 and 25, and finally the output line 26 for delivery to output terminal 27 of the A.-C. output signal. From the terminals 27 of the individual detection circuit there are conductors 29 leading to the corresponding visual display devices 30 constituting the indicator array illustrated in Figs. 9 and 10.

Branch 21 of each adder circuit (Fig. 3) has an input terminal 40 supplied with its particular component ($e_1$ to $e_n$) of the input voltage array (Fig. 1), while branch 22 has an input terminal 41 supplied with the reference voltage signal delivered thereto by way of the appropriate lead of the "$a$" series of leads from the tap-off points of the reference voltage divider network N. These two voltage inputs to terminals 40 and 41, are added at the buffer point 42, after passing through buffer resistors 43 and 44, respectively, of equal magnitude. Since the reference voltage applied to terminal 41 is reversed in polarity at amplifier A, as heretofore noted, the net result at 42 is that one of the two voltages subtracts from the other. If the two voltages are exactly equal in magnitude, the output at 42 (hence at 27) will be zero. If they do not match, on the other hand, the line 26 will carry a resultant voltage of positive polarity if the upper branch energy predominates, and of negative polarity if the lower branch energy predominates. This resultant voltage is applied to the carrier wave input signal entering by way of line 23, and drives the modulator constituted by diodes 24 and 25 of opposite directivity, so that the result at output terminal 27 is an A.-C. voltage whose magnitude will be proportional to the D.-C. voltage resultant registered at junction 42. This voltage, if of sufficient magnitude, will illuminate visual display lamp 30 of the Fig. 9 (or Fig. 10) array.

If the predominant voltage applied to the modulator combination 24—25 is of positive polarity, diode 25 will conduct the D.-C. current supplied from junction 42, together with a fraction of the A.-C. signal impressed on line 23. If, on the other hand, the predominant voltage is of negative polarity, diode 24 will conduct the D.-C. current together with a fraction of the A.-C. signal. In either case, there will appear at display lamp 30 an A.-C. signal voltage proportional to the magnitude of said A.-C. signal, which latter will vary as the diode resistance varies. In this connection it should be noted that diodes 24, 25, whether of copper-oxide, silicon, germanium, selenium, or other nonlinear composition, have a common characteristic, namely, that of decreasing their resistance to forward current flow as the magnitude of such current flow increases. Such current flow, in the arrangement shown, will be proportional to the voltage differential (whether positive or negative) at point 42, hence the lamp 30 will provide an indication of the magnitude of the said voltage differential, since the voltage across said lamp will be proportional to the forward resistance across the diode 24, or 25, as the case may be.

The mode of operation of the device can now be traced through the system. An array of D.-C. voltages specifying some pattern appears on the input terminals of the pattern analyser. The voltages are added electronically, thereby deriving a voltage $\Sigma e$ that is their sum. The polarity of this signal is reversed, thereby deriving a voltage $-\Sigma e$. This voltage is connected across the tapped voltage divider, generating an array of reference voltages that are related to $-\Sigma e$ in precise ratios, on a decibel (as shown in Fig. 1), or other scale as desired. The array of reference voltages thereby established are all derived with respect to $$\frac{-\Sigma e}{n}$$

which is the mean or average voltage of the input array.

Figure 12:
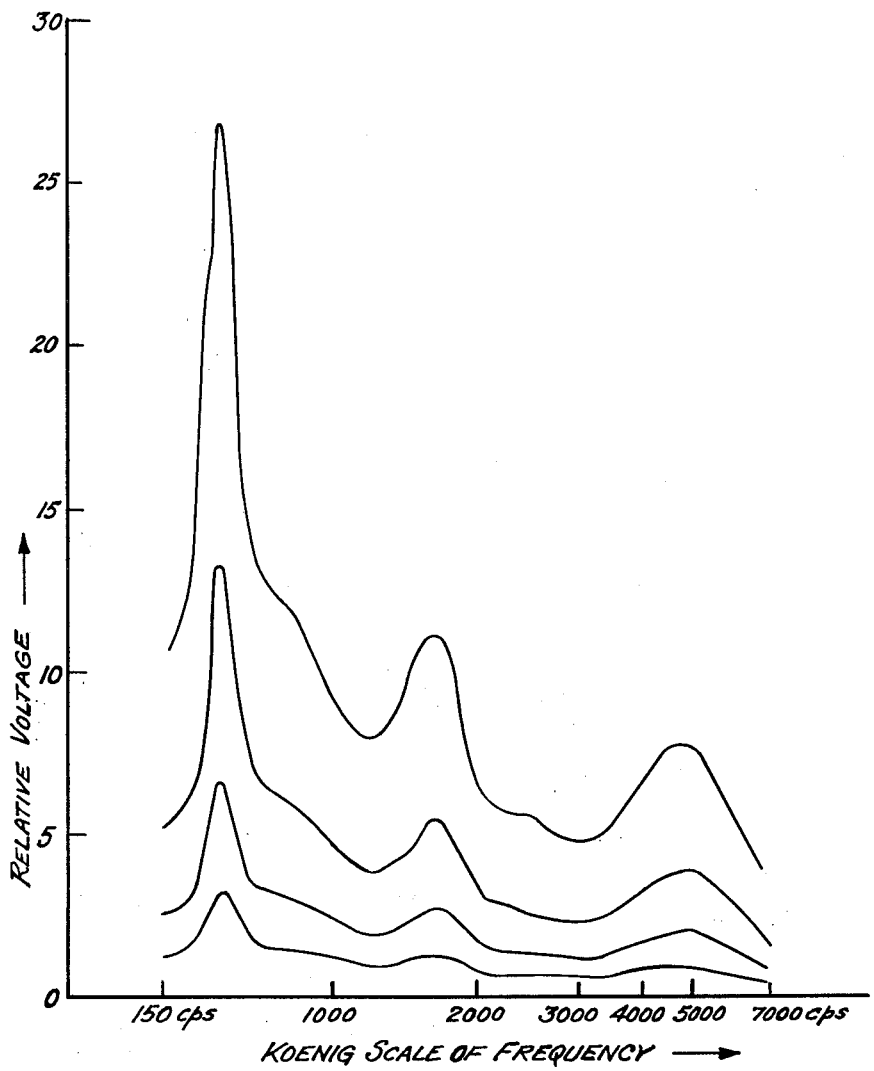
Figs. 12 and 13 are curves illustrating how the voltage pattern of a speech sound spectrum is altered by application of the present invention thereto.
Figure 13:
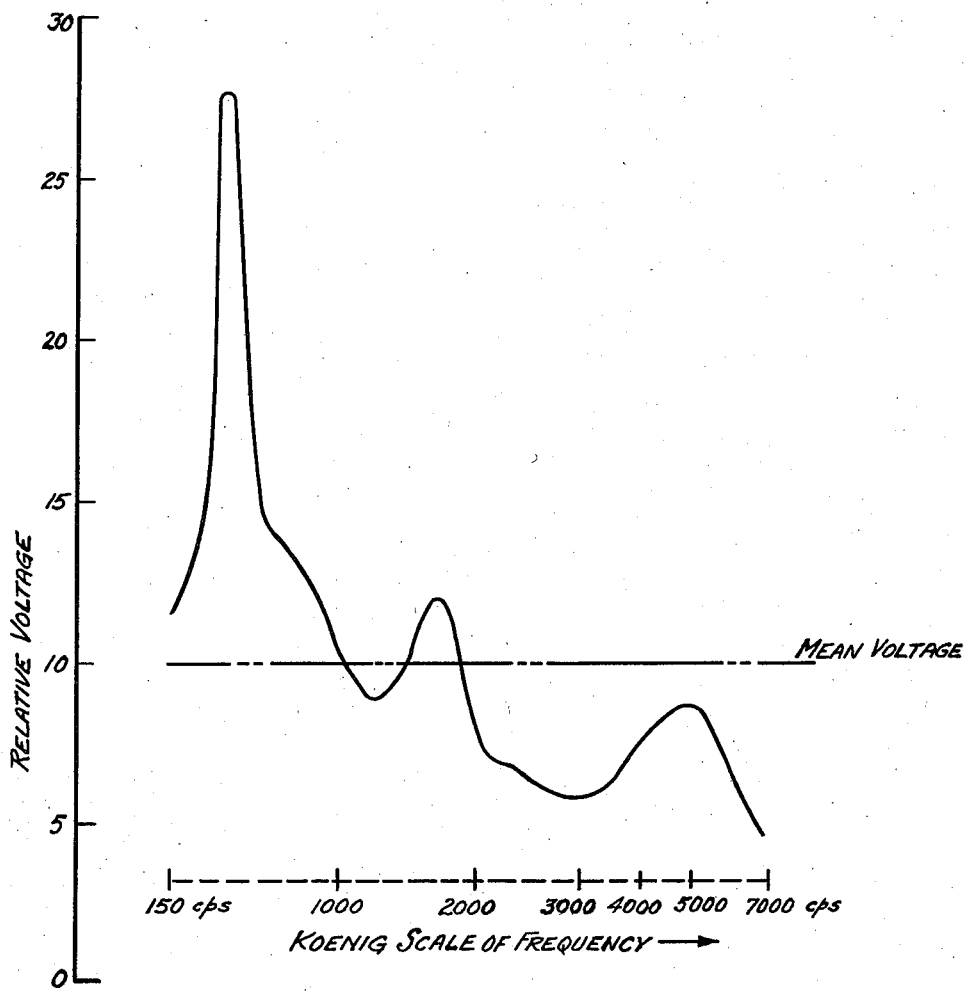

The array of input voltages and the array of reference voltages are matched or correlated in the matrix of detectors, thtereby identifying points in the matrix where the voltages are matched, i.e., where $e_{\text{input}} = e_{\text{reference}}$. The points where matching occurs in the matrix establish a new pattern of the input voltage distribution, specified in the new pattern with respect to the mean or average voltage of the input array, and on a decibel (or other) scale as established in the design of the reference voltage divider. Since the new pattern is established with respect to the mean or average voltage, first-order amplitude changes in the input array have been compensated. If a logarithmic scale is utilized, second-order amplitude changes will be normalized as well, and the input patterns of voltage distribution will be transformed to new patterns that still specify the distribution, but are stable with amplitude changes. (Fig. 13 illustrates the normalization of the voltage pattern whereas Fig. 12 illustrates the pattern as it would be without normalization.) By connecting the outputs from the detectors to a set of indicators arrayed in corresponding fashion (see Fig. 9 or Fig. 10), a visual display of the normalized pattern is achieved.

The design shown in Fig. 1 establishes an array of reference voltages having a 30 decibel spread, in equal 1 db increments. This design is convenient for the analysis of voice signal spectra, as measured in a set of analysing filters. The taps can be located to provide a 60 decibel spread in 2 decibel increments, a 40 decibel spread in 1 db increments, etc. If analysis in terms of a linear rather than decibel scale is desired, the taps on the voltage divider network can be arranged accordingly.

Figure 2:
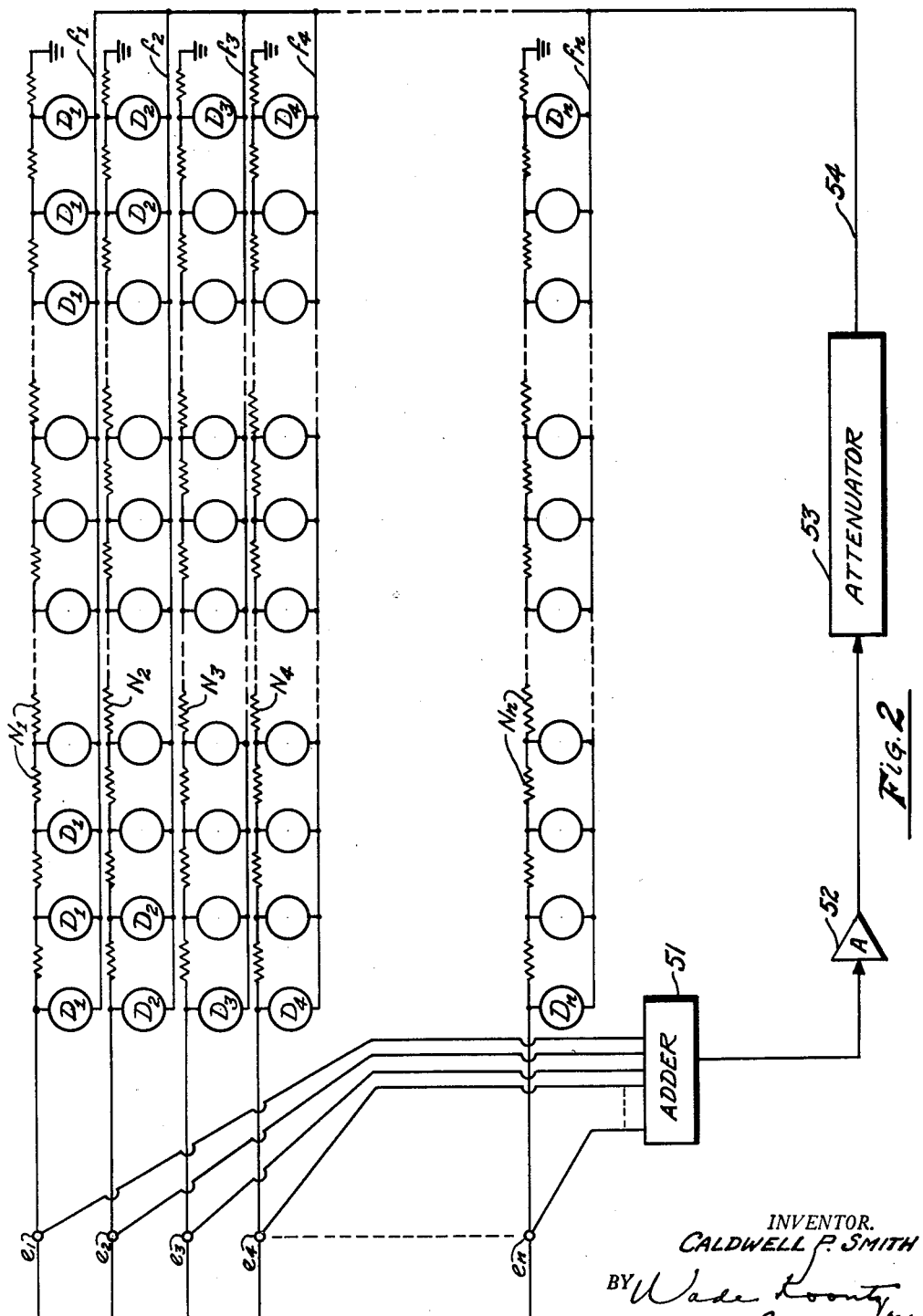
Fig. 2 is a diagram showing the reference voltage units in alternative positions in relation to the input signal detection units; this being a second embodiment of the invention.

In the embodiment of Fig. 2 each voltage input array has its own voltage divider network, as indicated at $N_1$ to $N_n$, and the units in each column of the detection matrix are supplied directly by successive divider networks, rather than by the same network, as in Fig. 1. The units are supplied with reference voltage by way of voltage adder 51, amplifier 52, attenuator 53, and parallel feeds $f_1$ to $f_n$, branching from the attenuator output line 54. In all other respects the system of Fig. 2 conforms to that of Fig. 1.

Figure 4:
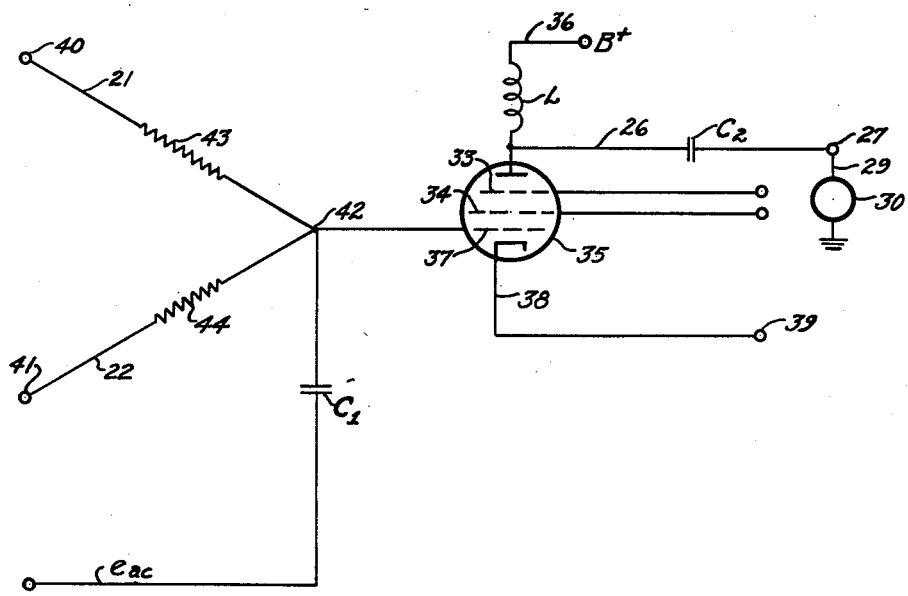
Fig. 4 is a circuit diagram of another form of signal detection unit, also adaptable for use in either the Fig. 1 or the Fig. 2 embodiment of the invention.

Fig. 4 illustrates a second form which the individual units of the detection matrix may take, in lieu of the form illustrated in Fig. 3. This Fig. 4 arrangement is the same as that of Fig. 3 in some respects, but differs from that of Fig. 3 in the inclusion of a gated-beam pentode tube 35 having quadrature and accelerator grids 33 and 34, respectively, and having an inductance L in its plate circuit 36 connected to a suitable B+ power source. An A.-C. carrier voltage $e_{ac}$ is impressed on control grid 37 by way of capacitor $C_1$ and the junction point 42, corresponding to junction 42 of Fig. 3. The cathode circuit 38 returns to a source 39 of operating D.-C. bias, so chosen that when the voltage at point 42 is zero, the A.-C. signal is operating at the point of maximum slope on its $e_{grid}$ versus $i_{plate}$ performance curve. Thus the A.-C. output voltage generated across plate inductance L and fed to gas glow tube 30 (through series blocking capacitor $C_2$) will be a maximum when the voltage at 42 is zero. As a voltage develops at point 42, whether of positive or negative polarity, the transconductance of tube 35 decreases, causing a corresponding decrease in the amplitude of the A.-C. signal on line 26; this decreased signal will be insufficient to maintain ionization of the glow tube 30, hence the visual display at 30 will be extinguished.

Fig. 5 illustrates the application of a periodic sampling technique to voltage analysis apparatus similar to that heretofore described. Periodic sampling is provided for by inserting a chopper switch S in the output circuit of the summing amplifier A, the switch being operated by any suitable means (not shown) to cause it to open and close at intervals of pre-selected time spacing, to establish the sampling frequency. This sampling frequency must be rapid enough to minimize the significance of intervening changes in D.-C. input level from one sampling to the next. Thus, the sampling repetivity rate is dictated by the rate of change in the voltage distribution pattern being measured. The chopper switch S may be operated by a vibrating reed, a motor-driven cam. an electronic switch, or other suitable means The chopper switch S periodically connects and disconnects the parallel circuit consisting of resistor 45 and capacitor 46 across the output terminal of amplifier A. When switch S closes, capacitor 46 charges up to the voltage $-\Sigma e$. The output terminal of amplifier A represents a low-impedance source, permitting capacitor 46 to charge up very rapidly. Theoretically, since the charging current is exponential, the voltage across capacitor 46 never quite attains $-\Sigma e$, being asymptotic to this value. However, the period during which chopper switch S is closed is sufficiently long that for practical purposes, the voltage across capacitor 46 reaches the value $-\Sigma e$ during the switch closure. The measurement is timed with respect to the moment chopper switch S opens, disconnecting capacitor 46 and resistance 45 from the output of amplifier A. When switch S opens, capacitor 46 discharges through resistor 45 connected across its terminals. The voltage across capacitor 46 decays exponentially, following laws well known in the electronics art.

The exponential decay of voltage across the capacitor establishes a time scale that is linearly related to the voltage expressed in decibels. That is, equal increments of time correspond to equal increments of voltage ratio expressed in decibels. This feature establishes a logarithmic reference scale of measurement, for comparing the voltage across the capacitor with the voltages $e_1$, $e_2$, $e_3$ etc. by means of a time measurement. Considering the ith input channel, if one measures the moment in time when the voltage input on this channel, $e_i$, is exactly equal in magnitude (and opposite in polarity) to the decaying voltage across the capacitor 46, the ratio $$\frac{\Sigma e}{e_i}$$

is specified by the time measurement.

The mean or average voltage of the set of input voltages, expressed as the sum of the input voltages divided by the number of channels $n$ can readily become the basis of measurement, by subtracting a constant number of decibels, i.e., 20 $\log_{10} n$. Thus it is apparent that the end result, that is, the measurement of the ratio of the voltage on each channel with the mean or average voltage, expressing the ratio on a decibel scale, is precisely the same as achieved in the previously described system.

The input voltages are automatically compared with the reference voltage waveform in the detectors of Fig. 5. The detector circuits are illustrated in Fig. 6.

The detectors consist of a means for adding together the channel voltage and the reference voltage waveform, and a means for measuring the moment in time when the two voltages are equal in magnitude.

Due to the reversal of polarity of the $\Sigma e$ voltage, the adder circuits have the effect of subtracting the reference voltage waveform from the channel voltage. At the instant the chopper switch S opens, this voltage always will have the polarity of $-\Sigma e$, since the magnitude of $-\Sigma e$ is always greater than the magnitude of any individual channel voltage. At the instant in time when the reference voltage waveform has precisely the same magnitude as the channel voltage, the voltage waveform at the output of the adder circuit will pass through zero voltage. Measurement of the time interval between the moment the switch S opens, and the moment the voltage waveform at the output of the adder circuit passes through "zero," specifies the ratio of channel voltage to mean or average voltage, with the ratio expressed on a decibel scale.

The electronic switch of Fig. 6, in the form of a triode tube 55 triggered by the output of adder 42 and having the output characteristic illustrated in Fig. 6a, provides a means of determining the precise instant when the voltage output from the adder passes through zero. The electronic switch may take various forms: for example, a magnetic "flip-flop," a gated-beam electron tube of the type commonly used in limiters and pulse circuitry, a multivibrator, a high-gain amplifier having very narrow linear range and driven into its non-linear regions, diodes used as non-linear elements, etc. The particular circuit of Fig. 6 has a mode of operation that is typical of this class of devices. There is a narrow region of control of output voltage by input voltage, in the region of zero input voltage. If the input voltage decreases in magnitude, with a positive polarity, the output voltage increases abruptly to a constant value, and does not decrease further for decreasing input. If the input is driven negative, the output rises abruptly and does not increase for larger negative inputs. Thus the device acts as a switch.

The dynamic analysers that have been described offer particular advantages in the analysis of speech signals, music, and other complex signals whose frequency spectra are to be ascertained. Fig. 7 illustrates a speech analyser system, in which a set of contiguous band filter channels, with associated rectifiers, and smoothing circuits to convert the signal in each frequency band to a D.-C. signal, is used to provide the set of input D.-C. signals to the dynamic analyser system using periodic sampling. The dynamic analyser transforms the D.-C. voltages to a set of new parameters specifying the spectrum, as resolved by the set of filters, on a decibel amplitude scale that is normalized with respect to amplitude of the input signal to the filters.

An alternative speech analyser system is illustrated in Fig. 8. Here the D.-C. voltages derived from the analysing filter set, with associated rectifiers and smoothing circuits, are measured in an analysing matrix, of the type of Fig. 1. The dynamic analyser of Fig. 2 can be substituted for that shown, to obtain an equivalent mode of operation.

In these speech analysers, the exact choice of filter band frequencies, number of filter bands, and number of quantized amplitude levels established in the dynamic analyser can be selected, according to the particular fineness of resolution sought in the analysis. The transformed patterns can be visually displayed, as indicated in Figs. 10 and 11.

What is claimed is:

1. Apparatus for analysing and normalizing the content of an electrical signal pattern which comprises, first, means for dividing the signal pattern into a series of component segments, secondly, means for deriving a series of voltages, each representative of a different one of said pattern segments, thirdly, means for deriving a reference voltage equivalent to the sum of said first-named voltages, and fourthly, means for comparing each of said first-named voltages with said reference voltage, to determine the ratio therebetween, said comparing means also operating to maintain said signal pattern stable throughout periods of signal amplitude variation.

2. In electronic measurement, in combination with a set of signal input terminals for reception of D.-C. voltage components collectively constituting a signal pattern, means for deriving a reference voltage equivalent to the sum of said D.-C. voltage components, and means for determining the ratio between each of said D.-C. voltage components and said reference voltage, said ratio-determining means also operating to maintain said signal pattern stable throughout periods of signal amplitude variation.

3. In electronic measurement, in combination with a set of signal input terminals for reception of D.-C. voltage components collectively constituting a signal pattern, means for deriving a reference voltage equivalent to the sum of said D.-C. voltage components, and means for determining the ratio between each of said D.-C. voltage components and said reference voltage, said ratio-determining means including a voltage divider network, and a matrix of voltage comparison circuits interconnecting said D.-C. voltage components and said network in a manner to maintain said signal pattern stable throughout periods of signal amplitude variation.

4. In electronic measurement, in combination with a set of signal input terminals for reception of D.-C. voltage components collectively constituting a signal pattern, means for deriving a reference voltage equivalent to the sum of said D.-C. voltage components, means for determining the ratio between each of said D.-C. voltage components and said reference voltage, and means for deriving voltages proportional to said ratios, said means comprising a matrix of voltage-correlating detection circuits operating to maintain said signal pattern stable throughout periods of signal amplitude variation and thereby establishing a normalized pattern of voltage distribution.

5. In electronic measurement, in combination with a set of signal input terminals for reception of D.-C. voltage components collectively constituting a signal pattern, means for deriving a reference voltage equivalent to the sum of said D.-C. voltage components, means for determining the ratio between each of said D.-C. voltage components and said reference voltage, means for deriving voltages proportional to said ratios, said means comprising a matrix of voltage-correlating detection circuits establishing a normalized pattern of voltage distribution which is stable throughout periods of signal amplitude variation, and means including an array of indicator lamps electrically interconnecting with said voltage-correlating detection circuits to selectively receive sustained energization so long as their respective voltage detection circuits are registering a voltage output of predetermined magnitude, whereby said selectively energized lamps constitute a visual display of said normalized pattern.

6. In electronic measurement, a pattern of distribution of motivating forces, a multiplicity of transducers having D.-C. voltage outputs proportional to motivating force inputs, thereby establishing a multiplicity of D.-C. voltages proportional to said pattern of distribution of motivating forces, means for deriving a voltage equivalent to the sum of said D.-C. voltage outputs, and means for automatically determining the ratio between each D.-C. voltage output and said sum voltage in a manner to maintain said pattern of distribution stable throughout periods of fluctuation in the instantaneous amplitudes of the motivating forces.

7. In electronic measurement, a pattern of distribution of motivating forces, a multiplicity of transducers having D.-C. voltage outputs proportional to motivating force inputs, thereby establishing a multiplicity of D.-C. voltages proportional to said patterns of distribution of motivating forces, means for deriving a voltage equivalent to the sum of said D.-C. voltage outputs, means for automatically determining the ratio between each D.-C. voltage output and said sum voltage, means for deriving voltages proportional to said ratios, thereby establishing a normalized pattern free of the amplitude fluctuations in, but proportional to the said pattern of distribution of motivating forces, and means including an array of indicator lamps electrically interconnecting with said voltage-correlating detection circuits to selectively receive sustained energization so long as their respective voltage detection circuits are registering a voltage output of predetermined magnitude, whereby said selectively energized lamps constitute a visual display of said normalized pattern.

8. In signal analysis, an input signal, a multiplicity of analysing frequency-band filters for dividing said input signal into frequency sub-bands, a rectifier circuit for converting each frequency sub-band signal to a D.-C. signal, a resistance-capacitor filter circuit for smoothing said rectified D.-C. signals, thereby establishing by means of said filters, rectifiers, and smoothing circuits a multiplicity of D.-C. voltages characterizing the frequency spectrum pattern of said input signal, means for deriving a voltage equivalent to the sum of said D.-C. voltages, means for comparing each D.-C. voltage with said sum voltage, means for automatically determining the ratio between each D.-C. voltage and said sum voltage, and means for deriving voltages proportional to said ratios but stable throughout periods of input signal amplitude variation, thereby establishing a multiplicity of voltages characterizing the normalized frequency spectrum pattern of said input signal.

9. In signal analysis, an input signal, a multiplicity of analysing frequency-band filters for dividing said input signal into frequency sub-bands, a rectifier circuit for converting each frequency sub-band signal to a D.-C. signal, a resistance-capacitor filter circuit for smoothing said rectified D.-C. signals, thereby establishing by means of said filters, rectifiers, and smoothing circuits a multiplicity of D.-C. voltages characterizing the frequency spectrum pattern of said input signal, means for deriving a voltage equivalent to the sum of said D.-C. voltages, means for comparing each D.-C. voltage with said sum voltage, means for automatically determining the ratio between each D.-C. voltage and said sum voltage, means for deriving voltages proportional to said ratios but stable throughout periods of input signal amplitude variation, said means comprising a matrix of voltage-correlating detection circuits establishing a multiplicity of voltages characterizing the normalized frequency spectrum pattern of said input signal, and means including an array of indicator lamps electrically interconnecting with said voltage-correlating detection circuits to selectively receive sustained energization so long as their respective voltage detection circuits are registering a voltage output of predetermined magnitude, whereby said selectively energized lamps constitute a visual display of said normalized frequency spectrum pattern.

10. In electronic measurement, a multiplicity of D.-C. voltages specifying a pattern of voltage distribution distributed on a set of input terminals, means for deriving a voltage equivalent to the sum of said D.-C. voltages, means for establishing a multiplicity of reference D.-C. voltages related to said sum voltage by precise ratios, thereby establishing an array of D.-C. reference voltages precisely related to said sum voltage, means for comparing each D.-C. input voltage with each D.-C. reference voltage, and means for automatically determining which D.-C. reference voltage is most nearly identical in magnitude with each input D.-C. voltage in a manner to maintain stability in said pattern of voltage distribution throughout periods of fluctuation in the instantaneous amplitudes of said pattern-specifying D.-C. voltages.

11. In electronic measurement, a multiplicity of D.-C. voltages specifying a pattern of voltage distribution distributed on a set of input terminals, means for deriving a voltage equivalent to the sum of said D.-C. voltages, means for establishing a multiplicity of reference D.-C. voltages related to said sum voltage by precise ratios, thereby establishing an array of D.-C. reference voltages precisely related to said sum voltage, means for comparing each D.-C. input voltage with each D.-C. reference voltage, means for automatically determining which D.-C. reference voltage is most nearly identical in magnitude with each input D.-C. voltage, thereby establishing precise ratios most nearly relating each D.-C. input voltage and sum voltage, and means for deriving fluctuation-free voltages proportional to said ratios, thereby establishing a normalized pattern of voltage distribution having stability against fluctuations in the instantaneous amplitudes of said pattern-specifying D.-C. voltages, and, means for visual display of said normalized pattern.

12. In electronic measurement, a pattern of distribution of motivating forces, a multiplicity of transducers having D.-C. voltage outputs proportional to motivating force inputs, thereby establishing a multiplicity of D.-C. voltages proportional to said pattern of distribution of motivating forces, means for deriving a voltage equivalent to the sum of said D.-C. voltage outputs from transducers, means for establishing a multiplicity of reference D.-C. voltages related to said sum voltage by precise ratios, thereby establishing an array of D.-C. reference voltages precisely related to said sum voltage, means for comparing each D.-C. voltage output from transducers with each D.-C. reference voltage, and means for automatically determining which D.-C. reference voltage is most nearly identical in magnitude with each D.-C. voltage from said transducers, said determining means operating in a manner to maintain stability in said pattern of distribution throughout periods of fluctuation in the instantaneous amplitudes of said motivating force inputs.

13. In electronic measurement, a pattern of distribution of motivating forces, a multiplicity of transducers having D.-C. voltage outputs proportional to motivating force inputs, thereby establishing a multiplicity of D.-C. voltages proportional to said pattern of distribution of motivating forces, means for deriving a voltage equivalent to the sum of said D.-C. voltage outputs from transducers, means for establishing a multiplicity of reference D.-C. voltages related to said sum voltage by precise ratios, thereby establishing an array of D.-C. reference voltages precisely related to said sum voltage, means for comparing each D.-C. voltage output from transducers with each D.-C. reference voltage, means for automatically determining which D.-C. reference voltage is most nearly identical in magnitude with each D.-C. voltage from said transducers, said determining means operating in a manner to maintain stability in said pattern of distribution throughout periods of fluctuation in the instantaneous amplitudes of said motivating force inputs, thereby establishing precise ratios most nearly relating each D.-C. voltage from transducers and sum voltage, means for deriving voltages proportional to said ratios, thereby establishing a normalized pattern of voltage distribution characterizing the pattern of distribution of motivating forces, and means for visual display of said normalized pattern of voltage distribution.

14. In signal analysis, an input signal, a multiplicity of analysing frequency-band filters for dividing said input signal into frequency sub-bands, a rectifier circuit for converting each frequency sub-band signal to a D.-C. signal, a resistance-capacitor filter circuit for smoothing said rectified D.-C. signals, thereby establishing by means of said filters, rectifiers, and smoothing circuits a multiplicity of D.-C. voltages characterizing the frequency spectrum pattern of said input signal, means for deriving a voltage equivalent to the sum of said D.-C. voltages, means for establishing a multiplicity of reference D.-C. voltages related to said sum voltage by precise ratios, thereby establishing an array of D.-C. reference voltages precisely related to said sum voltage, means for comparing each D.-C. voltage output from filter bands with each D.-C. reference voltage, and means for automatically determining which D.-C. reference voltage is most nearly identical in magnitude with each D.-C. voltage from said filter bands, said determining means operating in a manner to maintain stability in said frequency spectrum pattern throughout periods of fluctuation in the instantaneous amplitude of said input signal, thereby establishing precise ratios most nearly relating each D.-C. voltage from filter bands and sum voltage.

15. In a signal analysis, an input signal, a multiplicity of analysing frequency-band filters for dividing said input signal into frequency sub-bands, a rectifier circuit for converting each frequency sub-band signal to a D.-C. signal, a resistance-capacitor filter circuit for smoothing said rectified D.-C. signals, thereby establishing by means of said filters, rectifiers, and smoothing circuits a multiplicity of D.-C. voltages characterizing the frequency spectrum pattern of said input signal, means for deriving a voltage equivalent to the sum of said D.-C. voltages, means for establishing a multiplicity of reference D.-C. voltages related to said sum voltage by precise ratios, thereby establishing an array, of D.-C. reference voltages precisely related to said sum voltage, means for comparing each D.-C. voltage output from filter bands with each D.-C. reference voltage, means for automatically determining which D.-C. reference voltage is most nearly identical in magnitude with each D.-C. voltage from said filter bands, said determining means operating in a manner to maintain stability in said frequency spectrum pattern throughout periods of fluctuation in the instantaneous amplitude of said input signal, thereby establishing precise ratios most nearly relating each D.-C. voltage from filter bands and sum voltage, means for deriving voltages proportional to said ratios, thereby establishing a normalized pattern of voltage distribution characterizing the frequency spectrum pattern of the input signal, and means for visual display of said normalized pattern.

16. In electronic measurement, a multiplicity of D.-C. voltages specifying a pattern of voltage distribution distributed on a set of input terminals, means for deriving a voltage equivalent to the sum of said D.-C. voltages, means for deriving from said sum voltage a periodic reference voltage waveform decaying exponentially in time, means for comparing said reference voltage waveform with each D.-C. input voltage, and means for determining ratio of each D.-C. voltage input to said sum voltage through said comparison, said ratio determining means operating to maintain stability in said pattern of voltage distribution throughout periods of fluctuation in the amplitude of said D.-C. voltages.

17. In electronic measurement, a pattern of distribution of motivating forces, a multiplicity of transducers having D.-C. voltage outputs proportional to motivating force inputs, thereby establishing a multiplicity of D.-C. voltage proportional to said pattern of distribution of motivating forces, means for deriving a voltage equivalent to the sum of said D.-C. voltage outputs from transducers, means for deriving from said sum voltage a periodic reference voltage waveform decaying exponentially in time, means for comparing said reference voltage waveform with each D.-C. voltage output from transducers, and means for determining ratio of each D.-C. voltage output voltage from transducers to said sum voltage through said comparison, said ratio determining means operating to maintain stability in said pattern of voltage distribution throughout periods of fluctuation in the amplitude of said D.-C. voltages.

18. In signal analysis, an input signal, a multiplicity of analysing frequency-band filters for dividing said input signal into frequency sub-bands, a rectifier circuit for converting each frequency sub-band signal to a D.-C. signal, a resistance-capacitor filter circuit for smoothing said rectified D.-C. signals, thereby establishing by means of said filters, rectifiers, and smoothing circuits a multiplicity of D.-C. voltages characterizing the frequency spectrum pattern of said input signal, means for deriving a voltage equivalent to the sum of said D.-C. voltages, means for deriving from said sum voltage a periodic reference waveform decaying exponentially in time, means for comparing said reference voltage waveform with each D.-C. voltage output from filter bands, and means for determining ratio of each D.-C. voltage from filter bands to sum voltage through said comparison, said ratio determining means operating to maintain stability in said pattern of voltage distribution throughout periods of fluctuation in the amplitude of said D.-C. voltages.

References Cited in the file of this patent

UNITED STATES PATENTS

| | | |
|---|---|---|
| 2,159,790 | Freystedt | May 23, 1939 |
| 2,576,249 | Barney | Nov. 27, 1951 |
| 2,680,228 | Smith | June 1, 1954 |
| 2,817,815 | Evans | Dec. 24, 1957 |